March 31, 1953  C. J. ROOD  2,633,244
OIL FILTER
Filed March 26, 1948
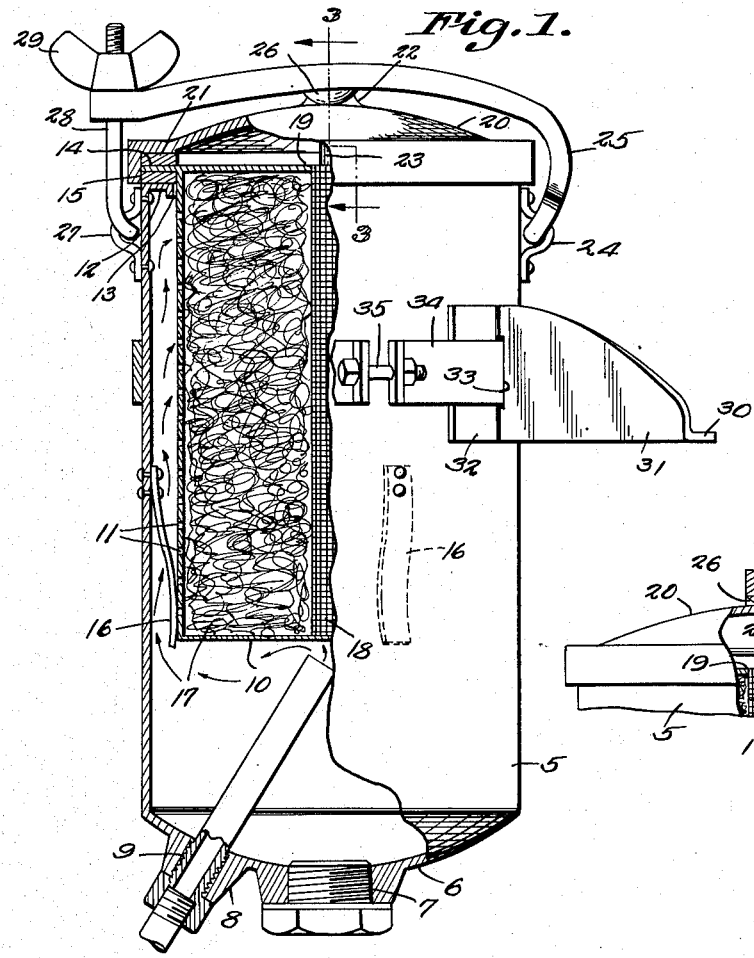
C. J. Rood
INVENTOR
BY C. A. Snow & Co.
ATTORNEYS.

Patented Mar. 31, 1953

2,633,244

UNITED STATES PATENT OFFICE 2,633,244

OIL FILTER

Clarence J. Rood, Fergus Falls, Minn.

Application March 26, 1948, Serial No. 17,160

1 Claim. (Cl. 210—131)

This invention relates to an oil filter, such as used on motor vehicles.

The primary object of the present invention is to provide an improved filter construction which will be inexpensive, durable, of improved efficiency as compared to conventional filters, and easily mounted or dismounted.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a view of an oil filter constructed in accordance with the invention, partly in side elevation and partly in vertical section.

Figure 2 is a top plan view, partly in section.

Figure 3 is a view of the upper or outlet end of the filter, partly in elevation and partly in vertical section, showing details of the outlet arrangement.

Referring to the drawing in detail, 5 designates an outer casing which is mainly cylindrical. The outer casing 5 is open at its top, but is integrally formed with a concavo-convex depressed bottom 6 centrally formed with drain opening 7 that is threaded to receive a suitable plug.

Formed on the marginal portion of the bottom 6 is a threaded nipple 8, disposed angularly relative to the axis of the casing 5. Removably threaded in nipple 8 is an inlet tube 9, the outer end of which is counterbored and threaded to receive a portion of the oil pressure line of the vehicle. Referring to Figure 1, inlet tube 9 is angularly disposed, and the inner end thereof extends a substantial distance above the bottom 6 of the outer casing, said inner end being disposed substantially in a line with the axis of the casing 5.

A filter container is designated 10. This is formed, preferably integrally, with a bottom that is wholly imperforate, a side wall which is foraminous as shown at 11, and an imperforate top plate.

The filter container 10 is of a diameter which, when the container is mounted in the outer casing 5 defines an annular space surrounding the filter container through which passes oil entering the casing 5 through inlet tube 9 is forced to pass.

The upper edge of the outer casing 5 is flanged inwardly as at 12, and the inner edge of flange 12 is downturned as at 13, so as to substantially engage the side wall of the filter container 10, and to provide means for aligning the filter container within the outer casing when the original or a new filter container is being inserted in said casing.

The top plate of the filter container 10 is extended beyond the foraminous side wall of the container so as to provide an annular flange 14, and a gasket 15 is interposed between said flange and flange 12 of the outer casing.

For the purpose of retaining the lower portion of the filter container 10 properly aligned relative to the outer casing, it is preferred to provide leaf springs 16 which are secured to the side wall of the outer casing and press against the filter adjacent the lower end thereof.

The filter container is filled with filter material 17, preferably shredded cotton. Mounted in the center of the filter container, and extending from top to bottom thereof, is a discharge tube 18, which can be and preferably is formed of screen material. At this point, it may be noted that screen material can also be used for forming the side wall of the filter container as will be apparent from the description of the operation of the oil filter to be provided hereinafter. The showing of a perforated side wall is purely illustrative of one construction which can efficiently be used.

As previously mentioned, the bottom of the filter container 10 is wholly imperforate. The top of the filter container, however, is imperforate except for the provision of a central opening 19, receiving the upper end of the discharge tube 18.

A cover for the outer casing 5 is designated 20, and this is mainly of concavo-convex construction, bulged outwardly relative to the filter so as to provide a discharge chamber of suitable dimensions to accommodate oil forced therethrough. The cover 20 is peripherally formed with a depending flange that embraces a gasket 21 interposed between the cover and the flange 14 of the filter container, the flange 14, and gasket 15.

To one side of its center, the cover 20 is integrally formed with a projection 22 having a threaded opening for connection to the oil pressure line of the engine, so that oil can be fed through said line back to the motor crank case. Mounted in the opening, so as to lead directly to the oil pressure line, is one end of an outlet tube 23, which is inclined inwardly and downwardly so that its other end is extended into the end of discharge tube 18. This construction is best shown in Figure 3. As seen from Fig. 3, the inlet end of the outlet tube 23 is below the plane of the flat upper end of the filter container or cartridge, while the outlet end of said tube 23 is substantially in the plane of the highest part of the dome-like cover 20.

To the side wall of the outer casing 5 is secured a keeper 24, providing a pivotal connection for one end of a curved locking arm 25 that extends over the cover 20, and that is centrally formed with a boss 26 adapted to engage the bulged cover. The other end of the locking arm 25 swings free, and is slotted to receive a bolt 28 pivoted in keeper 27. The bolt 28 is threaded to receive a wing nut 29. Thus, it may readily be noted that on loosening of the wing nut, the bolt 28 can be swung outwardly, releasing the locking arm 25. The cover can then be readily removed, and the filter container or cartridge becomes immediately available for removal, as when it is desired to replace it. In assembling the device, it is necessary only to reverse the procedure, and when the wing nut 29 has been tightly threaded against locking arm 25, the boss 26 will press against the center of the bulged cover 20, holding the parts properly assembled in a leak-proof arrangement.

For the purpose of mounting the device in position, I provide brackets 30 having openings to receive bolts or the like, whereby the brackets can be secured to an adjacent portion of the vehicle structure. The respective brackets have upstanding portions 31, the inner ends of which are outturned to provide ears 32. Ears 32 are curved conformably to the curvature of the outer casing.

Slots 33 are formed in the respective upstanding portions 31, and these receive a split sleeve or band 34. It may now be noted that when it is desired to mount the device in a vehicle, brackets 30 can be adjusted to any position desired, these sliding on the band 34. Thus, although the brackets are illustrated as being rather closely spaced apart, one of them can be moved around the outer casing, and positioned as desired for the purpose of overcoming any mounting problem which might arise by reason of the construction of the particular vehicle and the position of the filter device relative to the vehicle construction.

When the sliding brackets 30 have been adjustably positioned as desired, a bolt 35 is used to tighten the sleeve 34 to the outer casing, so as to fix the brackets in position and hold the entire device immovable relative to the vehicle structure.

In operation, oil is forced into the inlet tube 9, being discharged from the inner end thereof, a substantial distance above the bottom 6 of the outer casing. The inner end of the inlet tube, it may be noted, is spaced closely from the imperforate bottom of the filter container 10, and as a result, the oil is forced radially of said bottom, toward the annular space between the side walls of the filter container and outer casing respectively.

By reason of this construction, the oil, before entering the filter container and moving through the filter material contained therein, leaves its heavier substances in the open lower portion of the outer casing. These substances gravitate toward the depressed bottom 6, and tend to move toward the center thereof. Thus, they can be drained through drain opening 7, without difficulty. Continuing, the oil is forced upwardly into the annular passage mentioned above, and surrounding the filter container side wall. The oil is free now only to move through the foraminous side wall of the filter container which as mentioned, may be either of perforated sheet material or of screen material as desired. All the oil, as it enters the filter container 10, will be forced toward the center of the container, since the oil will be entering the container from all sides, and from top to bottom thereof. The oil is thus filtered, and is forced into the screen discharge tube 18, entering said tube from top to bottom thereof, that is, the oil will enter the discharge tube at all points from one end of the tube to the other.

The oil is now free to move only through the upper end of the discharge tube 18, and this filtered oil will fill the discharge chamber defined between the bulged cover 20 and the imperforate top plate of the filter container 10. The oil will then be forced under pressure through the outlet tube 23, and thence back to the motor crank case.

An important characteristic of the construction is the fact that before the oil is permitted to enter the filter container 10, it is spread radially under pressure through the lower portion of the outer casing 5, so as to discharge all heavier substances before the oil moves on into the filter material 17. Thus, the life of the filter material is effectively prolonged, and its filtering action is preserved a considerably longer period of time.

A further important characteristic of the operation of my improved filter is the fact that all portions of the filter material 17 are continuously impregnated with the oil to an equal extent, from top to bottom of the filter container. This results from the fact that the oil flows in an annular path from the lower to the upper end of the filter container, and is forced through the foraminous side wall of the container at the same time and in equal amounts at all points around the foraminous side wall, and from top to bottom thereof. Discussing this operation further, it will readily be observed that oil so forced into the filter container will be caused to travel inwardly toward a line drawn longitudinally and centrally through the container, in a horizontal path, considering Figure 1. In other words, oil forced through any one of the openings 11 travels straight inwardly to the screen discharge tube 18.

The net result of such a construction is that all the filter material within the container 10 discharges with full efficiency its intended function and a greater amount of oil is not forced through any portion of said filtering material than is forced through any other portion.

Additionally, important characteristics of the invention reside in its means of assembly or disassembly, whereby manipulation of a single wing nut permits accessibility to and ready removal of all interior portions of the filter, and in its mounting means, whereby the device can be readily secured to the vehicle structure, despite peculiarities in the position which might have to be assumed by the filter, or peculiarities in the adjacent vehicle structure, which would differ in various makes of vehicles.

What is claimed is:

An oil filter comprising an elongated tubular casing, a concavo-convex end wall carried by and closing one end of the casing, the concave side of said end wall facing the casing, said end wall having an axial sediment drain opening extending therethrough, an elongated tubular filter container mounted in the casing adjacent the end thereof remote from the end wall, said filter container having concentric foraminous inner and outer side walls defining between them an annular space, a filtering medium filling said space, the outer foraminous side wall lying in spaced concentric relation to the casing, an imperforate wall closing the end of the filter container adjacent the end wall of the casing and defining with said end wall a sediment trap, a wall closing the end of the container remote from the imperforate wall and having an axial oil discharge opening extending therethrough which communicates with the interior of the inner foraminous wall, a cover removably closing the end of the casing remote from the end wall, an elongated oil feed pipe carried by and extending through the end wall adjacent one side of the sediment drain opening, said pipe having its discharge end disposed adjacent the center of the imperforate wall to cause unfiltered oil entering the filter through the feed pipe to impinge upon the imperforate wall and spread laterally across the imperforate wall while sediment carried thereby settles to the bottom of the sediment trap, and elongated filtered oil discharge pipe carried by and extending radially through the cover, and the intake end of said discharge pipe being disposed within the axial oil discharge opening.

CLARENCE J. ROOD.

REFERENCES CITED

The following references are of record in the file of this patent:

UNITED STATES PATENTS

| Number | Name | Date |
|---|---|---|
| 513,551 | Allison | Jan. 30, 1894 |
| 1,422,190 | Elrod | July 11, 1922 |
| 1,969,033 | Redner | Aug. 7, 1934 |
| 1,976,547 | Dumas | Oct. 9, 1934 |
| 2,098,102 | McLean | Nov. 2, 1937 |
| 2,106,218 | Krieck | Jan. 25, 1938 |
| 2,117,361 | Rohrbach | May 17, 1938 |
| 2,249,071 | White | July 15, 1941 |
| 2,287,526 | Krogman | June 23, 1942 |
| 2,319,421 | MacLaren | May 18, 1943 |
| 2,323,152 | Metcalf | June 29, 1943 |
| 2,392,901 | Brown | Jan. 15, 1946 |
| 2,454,033 | Briggs | Nov. 16, 1948 |
| 2,562,735 | Pick | July 31, 1951 |

FOREIGN PATENTS

| Number | Country | Date |
|---|---|---|
| 404,309 | Great Britain | Jan. 12, 1934 |